United States Patent
Takahashi et al.

(10) Patent No.: US 9,547,285 B2
(45) Date of Patent: Jan. 17, 2017

(54) ELECTRICITY DEMAND REGULATING SYSTEM AND DEMAND ADJUSTMENT EXECUTIVE SYSTEM

(71) Applicant: HITACHI, LTD., Tokyo (JP)

(72) Inventors: Hirotaka Takahashi, Tokyo (JP); Yasushi Tomita, Tokyo (JP); Ikuma Sugamata, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 436 days.

(21) Appl. No.: 14/165,626

(22) Filed: Jan. 28, 2014

(65) Prior Publication Data

US 2014/0257582 A1    Sep. 11, 2014

(30) Foreign Application Priority Data

Mar. 8, 2013 (JP) ................ 2013-046082

(51) Int. Cl.
   *G05D 3/12* (2006.01)
   *G05B 13/02* (2006.01)
   (Continued)

(52) U.S. Cl.
   CPC .............. *G05B 13/02* (2013.01); *G06Q 10/04* (2013.01); *G06Q 50/06* (2013.01)

(58) Field of Classification Search
   None
   See application file for complete search history.

(56) References Cited

U.S. PATENT DOCUMENTS 6,735,553 B1 * 5/2004 Frogner ............... H04L 41/142
                                                      370/469
8,880,682 B2 * 11/2014 Bishop ............... G06F 11/3495
                                                      709/203
(Continued)

FOREIGN PATENT DOCUMENTS

EP    1 729 223 A2    12/2006
EP    2 413 276 A1     2/2012
(Continued)

OTHER PUBLICATIONS

Tina et al. "Hybrid solar/wind power system probabilistic modelling for long-term performance assessment". ScienceDirect Solar Energy 90 (2006) 578-588. Available online Jun. 14, 2005.*
(Continued)

*Primary Examiner* — Adam Lee
(74) *Attorney, Agent, or Firm* — Mattingly & Malur, PC

(57) ABSTRACT

There is provided an electricity demand regulating system which estimates a load amount of an individual equipment whose measurement information can not be acquired and improves estimation accuracy of an electricity demand amount in a power system. The electricity demand regulating system for managing electric energy used by a consumer according to an operation state of the power system includes a storage part to store measurement information of a consumer equipment, and a generation part to generate a load pattern indicating a load amount tendency from the measurement information of the equipment stored in the storage part. A load amount of an equipment whose measurement information is not stored in the storage part is estimated from the load pattern generated by the generation part, and an electricity demand amount of the consumer is obtained based on the measurement information and the estimated load amount.

17 Claims, 8 Drawing Sheets

(51) Int. Cl.
*G06Q 10/04* (2012.01)
*G06Q 50/06* (2012.01)

(56) References Cited

U.S. PATENT DOCUMENTS

| | | | |
|---|---|---|---|
| 2002/0010754 A1* | 1/2002 | Brown | G01D 4/004 709/217 |
| 2002/0019762 A1 | 2/2002 | Tomita et al. | |
| 2003/0055676 A1* | 3/2003 | Huneycutt | G06Q 50/06 705/412 |
| 2004/0044613 A1* | 3/2004 | Murakami | G06Q 40/04 705/37 |
| 2004/0093175 A1 | 5/2004 | Tan | |
| 2005/0015283 A1* | 1/2005 | Iino | G06Q 10/06315 705/4 |
| 2007/0005297 A1* | 1/2007 | Beresniewicz | G05B 23/0235 702/181 |
| 2007/0032911 A1* | 2/2007 | Clesle | H02J 3/00 700/291 |
| 2007/0203860 A1 | 8/2007 | Golden et al. | |
| 2009/0094173 A1* | 4/2009 | Smith | G01R 21/1335 705/412 |
| 2009/0163238 A1* | 6/2009 | Rao | H04W 52/225 455/522 |
| 2009/0192738 A1* | 7/2009 | Nentwig | G01R 23/20 702/66 |
| 2009/0254763 A1* | 10/2009 | Belady | G06F 1/206 713/300 |
| 2010/0222934 A1 | 9/2010 | Iino et al. | |
| 2011/0071882 A1* | 3/2011 | Jakagnanam | G06Q 10/04 705/7.31 |
| 2011/0238232 A1 | 9/2011 | Tomita et al. | |
| 2012/0059528 A1* | 3/2012 | Umesawa | G01D 4/002 700/295 |
| 2012/0109393 A1* | 5/2012 | Kosaka | G06Q 10/06 700/291 |
| 2012/0143385 A1* | 6/2012 | Goldsmith | H02J 3/38 700/297 |
| 2012/0144219 A1* | 6/2012 | Salahshour | G06F 1/3203 713/322 |
| 2012/0259471 A1* | 10/2012 | De Ridder | F01K 13/02 700/282 |
| 2013/0166084 A1* | 6/2013 | Sedighy | G06Q 50/06 700/291 |
| 2013/0173191 A1* | 7/2013 | McDonald | H02J 3/00 702/61 |
| 2013/0268136 A1* | 10/2013 | Cox | H02J 3/14 700/295 |
| 2013/0320762 A1* | 12/2013 | Trudel | H02J 3/14 307/31 |
| 2014/0018969 A1* | 1/2014 | Forbes, Jr. | H02J 3/32 700/295 |
| 2014/0081704 A1* | 3/2014 | Strelec | G06Q 30/0202 705/7.31 |
| 2014/0088774 A1* | 3/2014 | Bruschi | G06Q 30/0207 700/291 |

FOREIGN PATENT DOCUMENTS

| | | |
|---|---|---|
| JP | 2009-077498 A | 4/2009 |
| JP | 2010-166636 A | 7/2010 |
| JP | 2010-204833 A | 9/2010 |
| JP | 2011-036084 A | 2/2011 |
| JP | 2012-151992 A | 8/2012 |
| JP | 2013-132153 A | 7/2013 |
| WO | 2011/012134 A1 | 2/2011 |

OTHER PUBLICATIONS

Communication pursuant to Article 94(3) EPC received in corresponding European Application No. 14153503.9 dated Apr. 10, 2015.

European Search Report received in corresponding European Application No. 14153503 dated May 30, 2014.

Communication Pursuant to Article 94(3) EPC received in corresponding European Application No. 14 153 503.9 dated May 3, 2016.

\* cited by examiner

| CONSUMER ID | EQUIPMENT ID | DATE (YYYY.MM.DD) | TIME (hh:mm) | ELECTRICITY DEMAND (kW) |
|---|---|---|---|---|
| 1001 | 01 | 2012.04.01 | 12:00 | 4.0 |
| 1001 | 01 | 2012.04.02 | 12:00 | 2.5 |
| 1001 | 01 | 2012.04.03 | 12:00 | 3.5 |
| 1001 | 01 | 2012.04.04 | 12:00 | 4.0 |
| 1001 | 01 | 2012.04.05 | 12:00 | 3.0 |

| CONSUMER ID | EQUIPMENT ID | KIND | INDIVIDUAL SENSOR PRESENCE OR ABSENCE |
|---|---|---|---|
| 1001 | 01 | AA | PRESENCE |
| 1001 | 02 | BB | PRESENCE |
| 1001 | 03 | CC | PRESENCE |
| 1002 | 01 | AA | ABSENCE |
| 1002 | 02 | BB | ABSENCE |
| 1002 | 03 | CC | ABSENCE |

ELECTRICITY DEMAND REGULATING SYSTEM AND DEMAND ADJUSTMENT EXECUTIVE SYSTEM

BACKGROUND OF THE INVENTION

1. Technical Field

The present invention relates to a system for regulating a demanded electric energy in a power system.

2. Background Art

Hereafter, in addition to photovoltaic generation and wind generation using renewable energy, electric vehicles and plug-in hybrid vehicles become popular in large quantities, and therefore, it is prospective that a power flow mode is remarkably changed, and a load applied to a facility equipment such as a distribution substation or a pole mounted transformer becomes large. When the load exceeding a specified threshold is applied to the facility equipment, a breaker of the distribution substation is erroneously operated, and a blackout occurs in an area or the pole mounted transformer is burned out, and the power system can not be stabled. In order to solve such circumstances, some techniques to control the load are known.

For example, a technique disclosed in Patent Literature 1 (JP-A-2010-204833) is an energy management system having a demand side management function in which an energy load side is a control target. The system includes a load adjustment range prediction part to output a prediction result of a load adjustment range based on history data stored in a load operation/adjustment history database, and controls the load based on the prediction information. According to this technique, demand prediction can be performed based on the past storage data and outside conditions (weather etc.), and the load can be controlled so as not to exceed a specified threshold.

Besides, a technique disclosed in Patent Literature 2 (JP-A-2009-077498) relates to a load reduction plan decision system including demand prediction means for predicting electricity demand of an electric power receiver, demand prediction means for predicting demand which is electric energy required to be supplied from an electricity company, and plan decision means for deciding a load reduction plan which is an order plan of load reduction among plural loads. This technique includes a load reduction classification index to specify a load reduction order under a different weather condition, and weather prediction means for predicting weather of a plan day. The load reduction plan is decided based on the predicted weather of the plan day and the load reduction classification index, and the electricity demand can be regulated based on the decided load reduction plan.

However, according to the techniques disclosed in the above literatures, a load amount of an individual equipment having no past performance data (measuring means is not provided or measurement information can not be acquired) is not estimated, and accordingly, the dispersion is large as compared with actual load amount, and the accuracy of the demand prediction is low.

Besides, in an area where infrastructure environment is not developed, there are many cases in which the measurement information can not be acquired. Thus, also in such cases, more accurate electricity demand of the consumer equipment is required to be grasped.

SUMMARY OF THE INVENTION

In order to solve the problem, according to one embodiment of the invention, an electricity demand regulating system for managing electric energy used by a consumer according to an operation state of a power system includes a storage part to store measurement information of a consumer equipment, and a generation part to generate a load pattern indicating a load amount tendency from the measurement information of the equipment stored in the storage part. A load amount of an equipment whose measurement information is not stored in the storage part is estimated from the load pattern generated by the generation part, and an electricity demand amount of the consumer is obtained based on the measurement information and the estimated load amount.

Besides, the load pattern can be formed by using a probability density.

Further, the load amount of the equipment whose measurement information is not stored is estimated from the load pattern and based on a kind of the equipment whose measurement information is stored.

According to the embodiment of the invention, the load amount of the individual equipment whose measurement information can not be acquired is also estimated, and the estimation accuracy of the electricity demand amount in the power system can be improved.

DESCRIPTION OF EMBODIMENTS

Hereinafter, embodiments of the invention will be described. Incidentally, the following are merely examples and the invention is not intended to be limited to the following specific contents.

Figure 1:
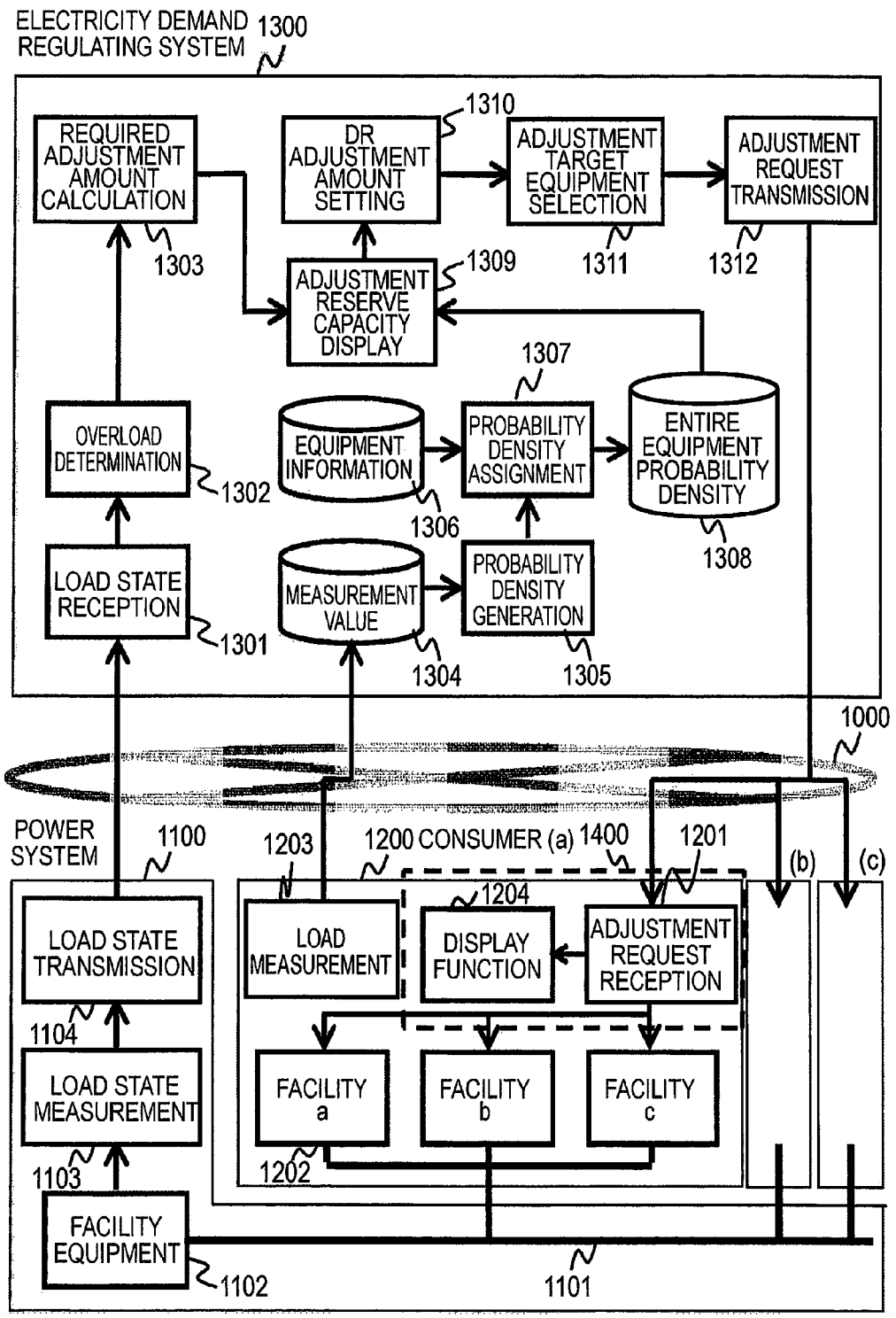
FIG. 1 is a whole structural view of an electricity demand regulating system for a power system according to an embodiment.

FIG. 1 is a whole structural view of an electricity demand regulating system for a power system according to an embodiment.

The electricity demand regulating system for the power system disclosed in this embodiment includes a power system 1100, a consumer 1200 and an electricity demand regulating system 1300. The power system 1100 is connected with plural consumers 1200. The consumer 1200 receives power from the power system 1100. On the other hand, the electricity demand regulating system 1300 calculates a reduction amount of electricity demand, which is required to suppress the magnitude of the electricity demand to facilities capacity or less, based on the magnitude of the electricity demand of the power system 1100. The electricity demand regulating system 1300 specifies a facility equipment of the consumer 1200 whose working state is changed in order to reduce the electricity demand amount. Next, the electricity demand regulating system 1300 transmits a change instruction of the working state and a continuation time or period of the change of the working state to the specified facility equipment of the consumer. A demand adjustment executive system 1400 indicated by a broken line in FIG. 1 changes the working state of the corresponding equipment according to the change instruction of the working state and the continuation time or period of the change of the working state received from the electricity demand regulating system 1300, and displays the change content on a display part. The demand adjustment executive system 1400 changes the working state of the facility equipment of the consumer 1200, and the electricity demand of the facility equipment is changed. As a result, the electricity demand of the power system 1100 can be controlled.

Figure 2:
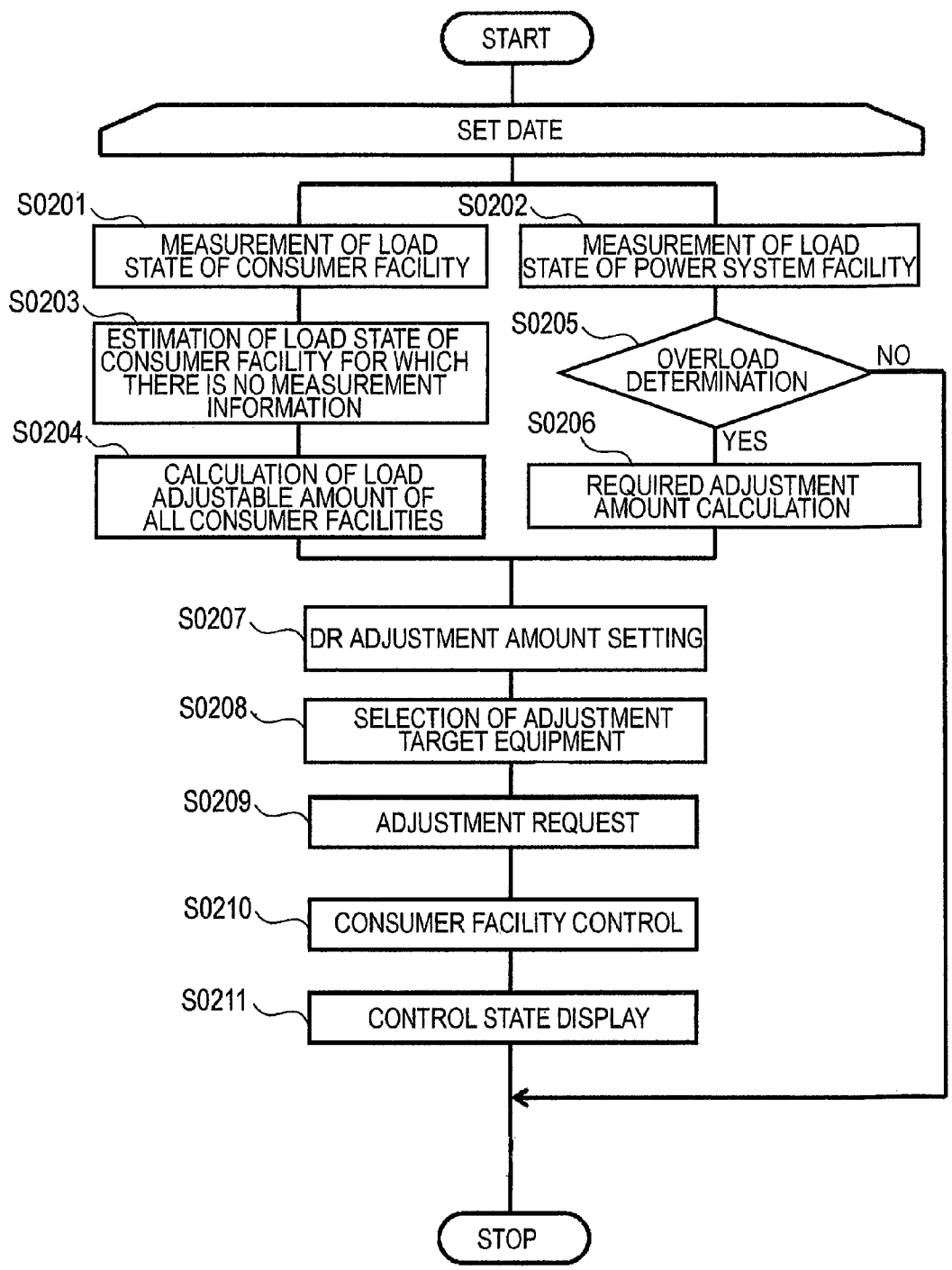
FIG. 2 is a flowchart of the whole processing of the electricity demand regulating system for the power system according to the embodiment.

A flowchart of the whole processing of the embodiment including the above structure will be described with reference to FIG. 2.

In the embodiment, the processing is performed every previously set date. Incidentally, the setting can be performed by a person, a calculator or other units.

First, the facility load of the consumer and the power system at the set date is measured by using a sensor or the like (S0201, S0202). Here, with respect to a consumer facility whose measurement can not be performed because there is no sensor, or a consumer facility whose measurement information can not be acquired due to communication environment or the like, the facility load is estimated by using an after-mentioned method (S0203). A load adjustable amount is calculated from the load states of all the consumer facilities obtained at the processes of S0201 and S0203 (S0204). On the other hand, after the facility load of the power system is measured (S0202), it is determined from the capacity (kVA) of the facility whether or not an overload occurs (S0205). If the overload does not occur, the electricity demand is not required to be regulated, and the processing is ended. If the overload occurs, the amount to be regulated is determined (S0206). The determination/calculation method will also be described later.

A DR (Demand Response) adjustment amount by which the power adjustment is actually performed is set from the obtained load adjustable amount and required adjustment amount (S0207). When the DR adjustment amount is set, the set value can be arbitrarily determined by a person or can be automatically determined by a calculator or another method. Besides, when the DR adjustment amount is determined, the facility equipment for which the adjustment is performed is selected (S0208). This can be determined in view of the priority, working state of the facility equipment, consumer's requests, and other parameters. A demand adjustment request is performed to the selected equipment (S0209). The demand adjustment executive system cooperating with the electricity demand regulating system of the embodiment controls the consumer facility based on the request (S0210). Besides, the control state of the consumer facility is displayed (S0211).

The above operation is performed every set date, and the electricity demand is controlled.

Hereinafter, the details of the processing flowchart will be described based on the respective function blocks shown in FIG. 1.

The power system 1100 includes a power transmission line 1101, facility equipment 1102, a load state measurement function 1103 and a load state transmission function 1104. The power transmission line 1101 is a facility to transmit power to the consumer 1200. The facility equipment 1102 is a facility equipment of the power system, such as a substation, a transformer or a sectionalizing switch. The load state measurement function 1103 is a sensor facility such as an ammeter or a wattmeter. The load state measurement function 1103 measures the load state of the facility equipment 1102 and outputs the result to the load state transmission function 1104. In the following, although the load state measurement function 1103 is assumed to be the wattmeter, the ammeter may be possible to be applied. When the ammeter is used as the load state measurement function 1103, a similar treatment can be performed by changing the unit from (kW) to (A) in the following description. The load state transmission function 1104 outputs the load state information of the facility equipment 1102 acquired from the load state measurement function 1103 to a load state reception function 1301 of the electricity demand regulating system 1300 through a communication line 1000.

The consumer 1200 is a consumer of power, such as a home, a school, a public office, a hospital or a building. FIG. 1 shows, as an example, a state in which three consumers (a), (b) and (c) are connected to the power system 1100. Hereinafter, the respective functions will be described in sequence. Each of the consumers 1200 is provided with an adjustment request executive function 1201, a facility 1202 and a display function 1204. A load measurement function 1203 is installed in only part of the consumers, and a state in which the load measurement function is installed only in the consumer (a) is shown as an example.

The adjustment request executive function 1201 receives, through the communication line 1000, the change instruction of the working state outputted by the electricity demand regulating system 1300 and the continuation time or period of the change of the working state. If the change of the working state is requested to the equipment belonging to the consumer to which the adjustment request executive function belongs, the control instruction to change the working state and the information of the continuation time or period in which the working state is changed are outputted to the equipment. Next, the adjustment request executive function 1201 outputs, to the display function 1204, the information indicating that the control instruction to change the working state is outputted to the facility 1202, and the information of the continuation time or period in which the working state is changed.

The facility 1202 is a facility equipment owned by the consumer 1200, and various types of facility equipments, such as a lighting facility, an air conditioning facility and a storage facility, are conceivable. Incidentally, FIG. 1 shows, as an example, a case where the three types of facility equipments a, b and c are provided in the consumer 1200.

The load measurement function 1203 is not installed in all the consumers 1200, but is installed in only part of the consumers 1200. The load measurement function 1203 measures the load state of the facility 1202 provided in the consumer 1200 in which the load measurement function is installed. The load measurement function 1203 records the measurement result in a measurement value database 1304 of the electricity demand regulating system 1300. It is conceivable that a unit of measurement is made an equipment unit or a consumer unit.

The display function 1204 is a function to visually display the state of whether or not the working state of the equipment 1202 of the consumer 1200 to which the display function belongs is changed by the adjustment request executive function 1201, and changes the display state according to the information received from the adjustment request executive function 1201. The details of the display state will be described later.

The electricity demand regulating system 1300 includes the load state reception function 1301, an overload determination function 1302, a required adjustment amount calculation function 1303, the measurement value database 1304, a probability density generation function 1305, an equipment information database 1306, a probability density assignment function 1307, an entire equipment probability density database 1308, an adjustment reserve capacity display function 1309, a DR adjustment amount setting function 1310, an adjustment target equipment selection function 1311, and an adjustment request transmission function 1312.

The load state reception function 1301 receives the load state information of the facility equipment 1102 measured by the load state measurement function 1103 from the load state transmission function 1104 through the communication line 1000, and outputs the received information to the overload determination function 1302.

The overload determination function 1302 compares the load state information of the facility equipment 1102 received from the load state reception function 1301 with a facility capacity of the facility equipment 1102 stored in a not-shown facility information storage function. The overload determination function determines whether or not the facility equipment 1102 is in an overload state, and outputs the result to the required adjustment amount calculation function 1303. The overload determination function 1302 determines whether or not the facility equipment 1102 is in the overload state according to a value of $\Delta P$ calculated by expression (1), and determines that the facility equipment is in the overload if $\Delta P$ has a positive value. Incidentally, in expression (1), $\Delta P$ denotes an overload amount (kW), D denotes a magnitude (kW) of a load applied to the facility equipment 1102, and C denotes a capacity (KVA) of the facility equipment 1102. Here, for simplification of the explanation, the power factor is assumed to be 1.

$$\Delta P = D - C \quad (1)$$

The required adjustment amount calculation function 1303 receives the determination result of whether or not the facility equipment 1102 is in the overload state from the overload determination function 1302. If the determination result indicates the overload, the required adjustment amount calculation function calculates the required adjustment amount for resolving the overload state of the facility equipment 1102 by using expression (2). In expression (2), X denotes the required adjustment amount (kW) of electricity demand for the facility (here, the facility equipment 1102), and $\Delta P$ denotes the overload amount (kW) of the facility and is calculated by expression (1). Further, M denotes a reserve range (margin) of electricity demand after reduction for the facility capacity of the facility and is a component for reducing the electricity demand so that a certain reserve capacity remains in the facility capacity.

$$X = \Delta P + M \quad (2)$$

The measurement value database 1304 is a database to record the information of electricity demand of the facility 1202 of the consumer 1200, which is measured by the load measurement function 1203.

Figures 3, 4, 5:
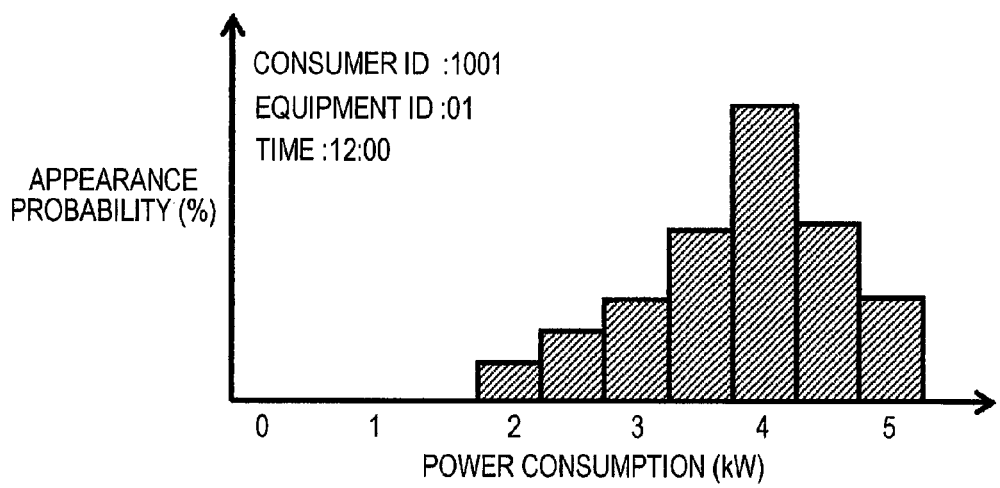
FIG. 3 is a view showing an example of a data format of a measurement value database.
FIG. 4 is a view showing probability density information generated by a probability density generation function.
FIG. 5 is a view showing an example of a data format of an equipment information database.

A data format of the measurement value database is shown in FIG. 3.

FIG. 3 shows an example of the data format of the measurement value database. Here, the electricity demand (kW) of the equipment is recorded for each consumer ID, each equipment ID, each date and each time. This example shows data of electricity demand which are for the consumer 1001 and the equipment 01 and are measured at 12:00 from Apr. 1, 2012 to Apr. 5, 2012. It is conceivable that the time is set at an interval of, for example, 30 minutes from 00:00 at night to 23:30 at next day. Besides, it is conceivable that the measurement value is rounded in units of, as an example, 0.5 (kW). The measurement value of the facility 1202 for each equipment of the consumer in which the load measurement function 1203 is installed and for each date is sequentially recorded in this format.

The probability density generation function 1305 of FIG. 1 is a function to generate a probability density of the electricity demand for each equipment and each time while the electricity demand (kW) of the facility 1202 recorded in the measurement value database 1304 is inputted. The generation method of the probability density may be a general method. For example, it is conceivable that in the data format shown in FIG. 3, with respect to the records of the results obtained by sorting the data by the consumer ID, the equipment ID and the time, the number of the records is counted for each value of the electricity demand, and the result is normalized to obtain the probability density.

FIG. 4 shows an example of the probability density information generated by the probability density generation function 1305. Here, the probability density of the electricity demand for consumer 1001, equipment 01 and time 12:00 is shown. The horizontal axis indicates electricity demand (kW), and the vertical axis indicates appearance probability (%). As stated above, the probability density generation function 1305 generates the probability density of the electricity demand for each consumer ID, each equipment ID and each time based on the information recorded in the measurement value database 1304. The information of the generated probability density is temporarily stored in a not-shown storage function.

The equipment information database 1306 stores information of the facility 1202 installed in the consumer 1200. FIG. 5 shows an example of a data format of the equipment information database.

FIG. 5 shows the information of the kind of the equipment, and the presence or absence of an individual sensor to measure the electricity demand of the equipment for each consumer ID and each equipment ID. The item of the kind of the equipment can be replaced by different content. For example, if the equipment specified by the consumer ID and the equipment ID is an electric water heater, the item can be replaced by rated capacity (kW) or capacity (L) of hot water tank.

Figure 6:
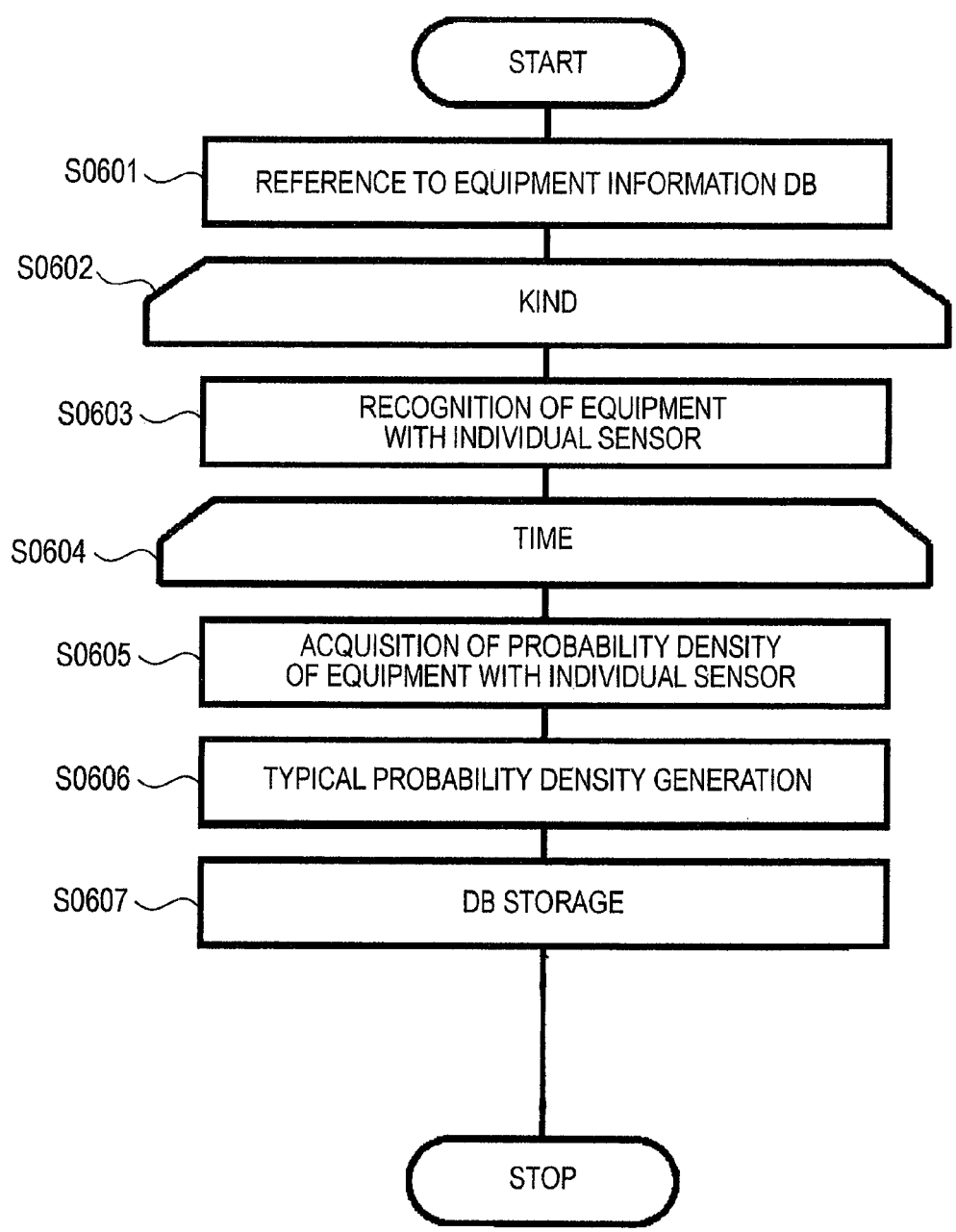
FIG. 6 is a view showing a flowchart of a probability density assignment function.

The probability density assignment function 1307 of FIG. 1 is a function to estimate the probability density of electricity demand of the facility 1202 of a consumer in which the load measurement function 1203 is not installed by using the output information of the probability density generation function 1305 and the record data of the equipment information database 1306. FIG. 6 shows a flowchart of the probability density assignment function 1307.

At process S0601, reference is made to the equipment information database 1306, and the recorded data (data format is shown in FIG. 5) is recognized.

Process S0602 is a loop process for each kind, and the loop process is performed for each kind recorded in FIG. 5.

At process S0603, an equipment with an individual sensor is recognized, and the equipment is recognized for which "presence" is written in the column of the individual sensor presence or absence of the data format of FIG. 5.

Process S0604 is a loop process for time, and the value of the time is made coincident with the time recorded in the measurement value database 1304.

At process S0605, the probability density of the equipment with individual sensor, the kind of which is the same as the kind specified at process S0602, is acquired. Incidentally, the probability density of the equipment with individual sensor is the information of the probability density generated by the probability density generation function 1305 and temporarily stored in the not-shown storage function.

Process S0606 is a typical probability density generation function. The typical probability density is defined as a probability density of a typical electricity demand determined for each kind of the consumer equipment. Here, the probability density of the equipment whose kind is the same as that determined at the process S0602 and to which the individual sensor is attached is acquired, and this is made the typical probability density. Incidentally, if there are plural equipments whose kinds are the same and to each of which the individual sensor is attached, a new probability density generated by, for example, combining and averaging the respective probability densities is made the typical probability density.

Figure 7:
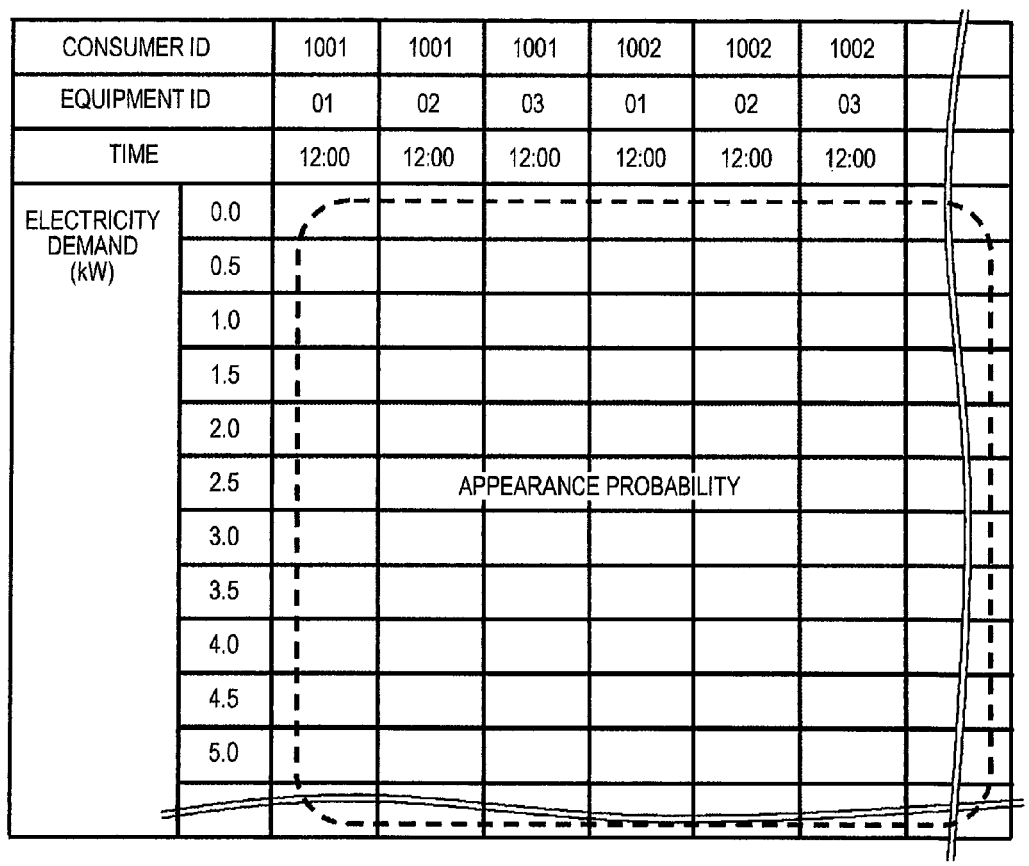
FIG. 7 is a view showing a data format of an entire equipment probability density database.

At process S0607, the typical probability density generated at the process S0606 is made the probability density of the equipment to which the individual sensor is not attached and is registered in the entire equipment probability density database 1308. This is because it is conceivable that the operation characteristics of the equipments of the same kind are the same for the respective equipments, and accordingly, it is conceivable that the probability distribution of the electricity demand is also the same for the respective equipments. FIG. 7 shows an example of a data format of the entire equipment probability density database. Here, the probability density for each combination of consumer ID, equipment ID and time is recorded, and the appearance probability is recorded for each electricity demand (kW) of the vertical axis.

Figure 8:
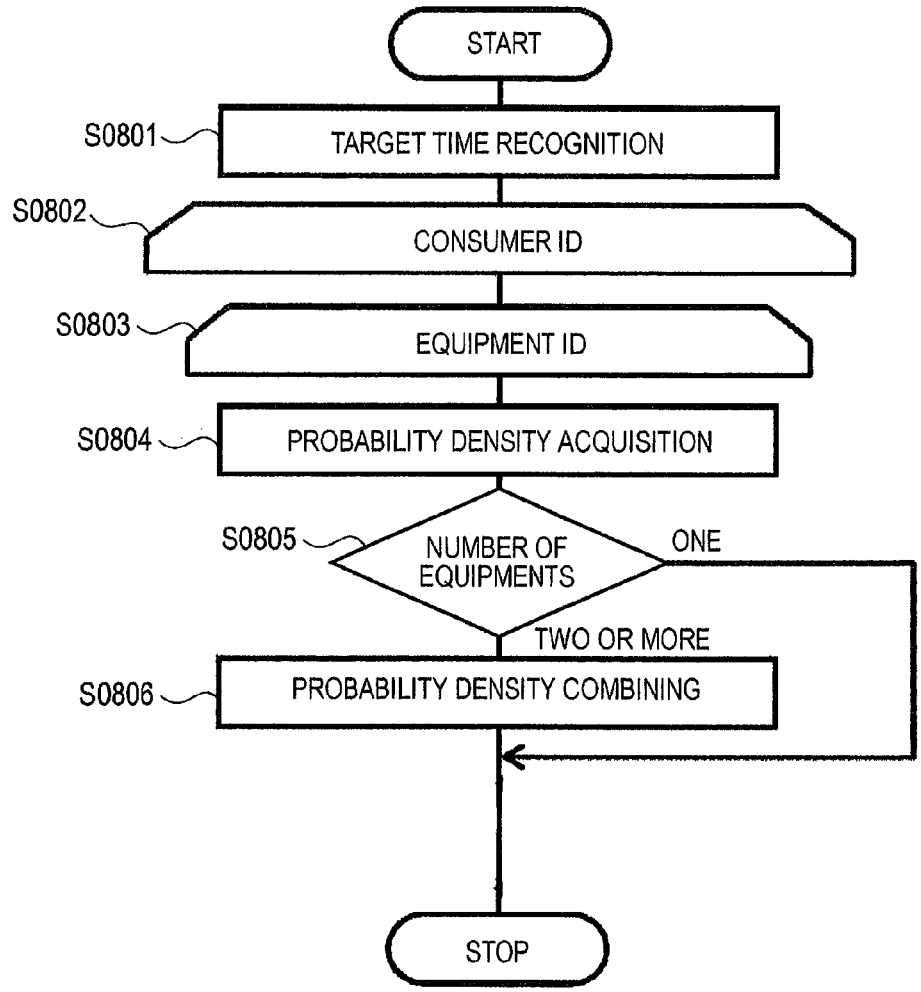
FIG. 8 is a flowchart of an adjustment reserve capacity display function.

The adjustment reserve capacity display function 1309 is a function to estimate and to display adjustment reserve capacity of consumer equipments in the whole area including the consumer 1200 in which the load measurement function 1203 is not installed. FIG. 8 shows a flowchart of the adjustment reserve capacity display function 1309.

Process S0801 indicates target time recognition, and the time is set at which the overload determination function 1302 determines that the overload occurs.

Process S0802 is a consumer ID loop, and the loop process is performed by the consumer ID (data format is shown in FIG. 7) recorded in the entire equipment probability density database 1308.

Process S0803 is an equipment ID loop (data format is shown in FIG. 7).

At process S0804, the probability density is acquired. The probability density of electricity demand of the equipment specified at the process S0802 and the process S0803 is acquired from the entire equipment probability density database 1308.

Process S0805 indicates branching of the number of equipments. If the number of the probability density functions acquired at the process S0804 is two or more, a shift is made to process S0806. On the other hand, if the number of the probability density functions acquired at the process S0804 is only one, the process S0806 is skipped.

Process S0806 is a probability density combining process. The probability density combining can be calculated by a convolution method.

The above process is performed by the number of combinations of the consumer ID and the equipment ID, the probability density of electricity demand adjustment capacity by the consumer equipment in area unit is estimated, and this is displayed on a not-shown output function. The output function is an equipment such as a monitor or a printer.

Figure 9:
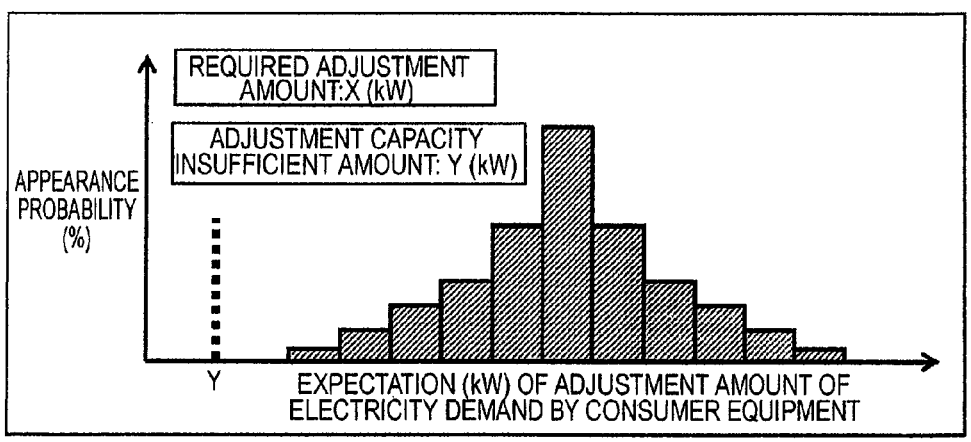
FIG. 9 is a view showing an example of an image displayed to an output function.

FIG. 9 shows an example of an image displayed on the output function. Here, the example shows the probability distribution of adjustment capacity by the consumer equipment in area unit, a required adjustment amount of an area, and an adjustment insufficient amount as a required adjustment amount which can not be sufficiently supplied by a demand adjustment function of a facility such as a storage battery installed in the power system. The required adjustment amount of the area is a value (here, X) calculated by the required adjustment amount calculation function 1303. The adjustment capacity insufficient amount Y is calculated by expression (3). Incidentally, in expression (3), B denotes a demand adjustment amount (kW) by a facility such as a storage battery separately installed in the power system.

$$Y = X - B \quad (3)$$

By the adjustment reserve capacity display function 1309, a system operator can visually grasp the positional relation between the probability density distribution of the electricity demand adjustment capacity by the consumer equipment in the area unit and the adjustment capacity insufficient amount Y. Accordingly, suitable setting of a target value of the load adjustment amount by the consumer equipment including supply of load adjustment capacity from market can be supported. Incidentally, the system operator may be a person or program software.

In the DR adjustment amount setting function 1310, the system operator sets an adjustment target value of an electricity demand adjustment amount by the consumer equipment based on the positional relation between the probability distribution of the electricity demand adjustment capacity by the consumer equipment in the area unit, which is outputted by the adjustment reserve capacity display function 1309, and the adjustment insufficient amount Y. The information of the set adjustment target value of the electricity demand adjustment amount is outputted to the adjustment target equipment selection function 1311. When the system operator is a person, an interface as shown in FIG. 10 is conceivable.

Figure 10:
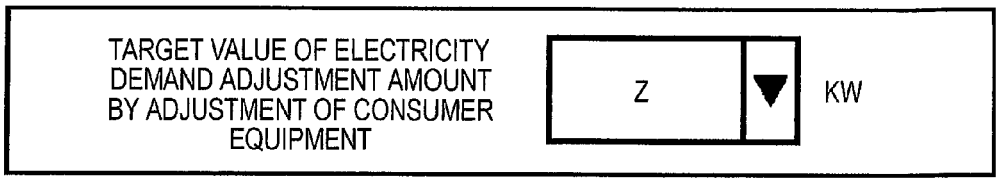
FIG. 10 is a view showing an example of an interface of a DR adjustment amount setting function.

FIG. 10 shows an example of an image of the interface for setting the adjustment target value by load adjustment of the consumer equipment. In this example, although the example is shown in which a numerical value is selected by pull-down function, the numerical value may be directly inputted by an input unit such as a keyboard.

Figure 11:
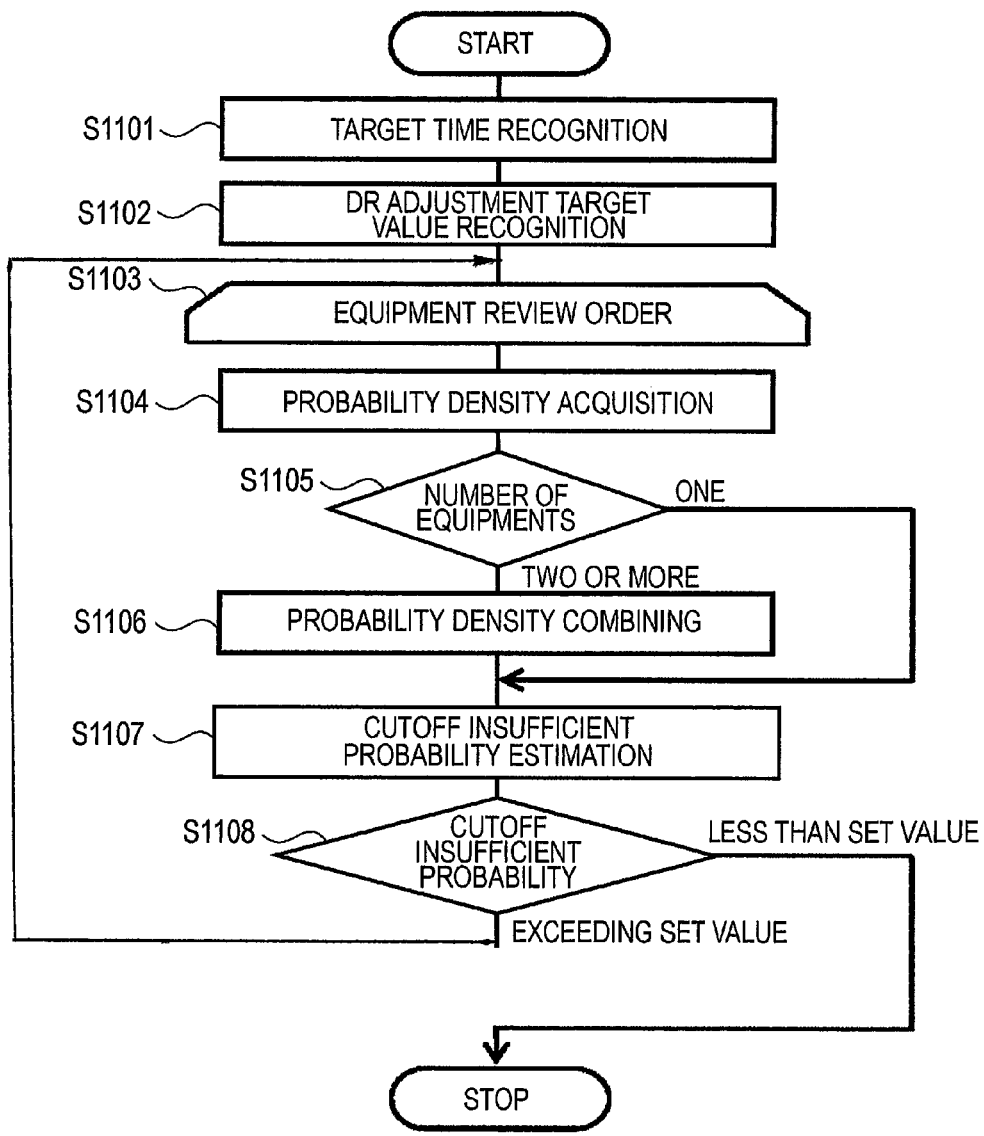
FIG. 11 is a flowchart of an adjustment target equipment selection function.

Based on the information of the adjustment target value of the electricity demand adjustment amount outputted by the DR adjustment amount setting function 1310, the adjustment target equipment selection function 1311 selects the consumer equipment whose working state is to be changed. FIG. 11 shows a flowchart of the adjustment target equipment selection function 1211.

Process S1101 indicates target time recognition, and the time is set at which the overload determination function 1302 determines that the overload occurs.

Process S1102 indicates DR adjustment target value recognition, and the value set by the DR adjustment amount setting function 1310 is recognized.

Process S1103 is a loop in an equipment review order. The equipment review order is such that the consumer facilities 1202 in the area are ordered in accordance with a rule. It is conceivable that the ordering rule is, for example, equipment type order, descending order of magnitude of rated power, ascending order of standard deviation of probability density, or the like.

Process S1104 is a probability density acquisition process, and the probability density of electricity demand of the equipment specified at S1103 is acquired from the entire equipment probability density database 1308.

Process S1105 is a branching process of the number of equipments. If the number of the probability density functions acquired at the process S1104 is two or more, a shift is made to process S1106. On the other hand, if the number of the probability density functions acquired at the process S1104 is one, the process S1106 is skipped.

The process S1106 is a probability density combining process. The probability density combining can be performed by a convolution method.

Process S1107 indicates estimation of load adjustment insufficient probability. The load adjustment insufficient probability is obtained by the positional relation between the combined probability density distribution and the DR adjustment target value recognized at S1102, and is calculated by expression (4). Where, R denotes the load adjustment insufficient probability, $S_{all}$ denotes an area of the combined probability density distribution, and S denotes an area of a region where the magnitude of the electricity demand adjustment amount is larger than the DR adjustment target value in the combined probability density distribution. That is, if the magnitude of the DR adjustment target value is coincident with the expected value of the combined probability density distribution, the magnitude of the load adjustment insufficient probability is 0.5.

$$R = S/S_{all} \qquad (4)$$

Process S1108 is a branching process of the magnitude of the load adjustment insufficient probability. If the magnitude of the load adjustment insufficient probability R calculated by expression (4) is larger than a previously registered set value, a return is made to the loop process of S1103. A consumer equipment whose working state is changed is added, and the processes subsequent to S1103 are again performed. On the other hand, if the magnitude of the load adjustment insufficient probability is not larger than the previously registered set value, the addition of an equipment as a load adjustment target is ended, and the processing is ended. The consumer equipment whose working state is changed is selected by the above processing. The selected consumer equipment is outputted as the list of the consumer ID and the equipment ID to the adjustment request transmission function 1312.

The adjustment request transmission function 1312 of FIG. 1 acquires the list of the consumer equipment whose working state is changed from the adjustment target equipment selection function 1311. Then, the adjustment request transmission function transmits a set of the control instruction and the continuation time information or period to the adjustment request executive function 1201 of the consumer in which the equipment as the load adjustment target is installed. The continuation time information is a previously set continuation time, for example, 30 minutes. Besides, in the case of the period information, a time after a previously set continuation time passes, for example, a time after 30 minutes from the current time is set.

When receiving the load adjustment instruction of the consumer facility from the adjustment request transmission function 1312, the adjustment request executive function 1201 of the demand adjustment executive system 1400 outputs the control instruction to change the working state to the equipment 1202. On the other hand, the adjustment request executive function outputs, to the display function 1204, information (the equipment ID and the continuation time or period of working state change) indicating that the working state of the consumer equipment is being controlled.

Figure 12:
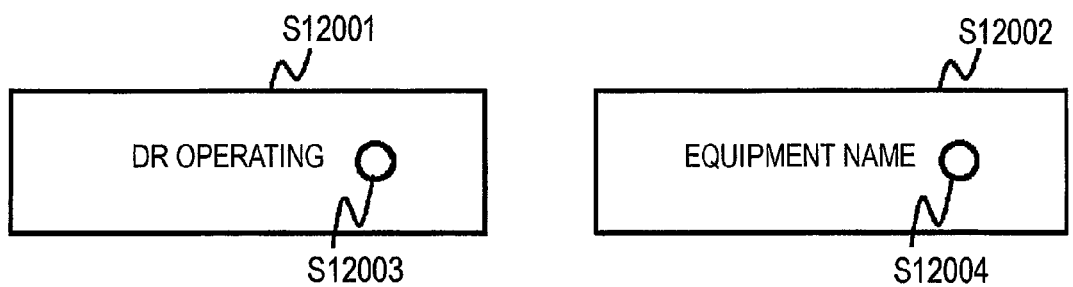
FIG. 12 is a view showing an example of an image displaying that a consumer equipment working state is being controlled.

FIG. 12 shows an example of an image to display that the working state of the facility 1202 is being controlled by the adjustment request executive function 1201. A display method 12001 does not display an equipment name but indicates whether or not the working state is being controlled, and the display is performed by the color of a lamp 12003 such as an LED. For example, when the working state is not being controlled, green is lit, and when the working state is being controlled, red is lit. A method 12002 displays whether or not the working state is being controlled, together with each equipment name. The working state of each equipment may be similarly displayed by a lamp 12004 such as an LED. Incidentally, the remaining time can be informed to a resident by using the continuation time or period information. For example, it is conceivable that a not-shown table of blinking intervals for the remaining time of the change control of the working state is previously provided, and the remaining time is displayed by the blinking interval by referring to the table. Further, various methods are conceivable, for example, the remaining time of the control time is displayed by a numerical value. By displaying whether or not the working state is being controlled, when the facility 1202 is abruptly stopped, the resident can know that the stop is not caused by a failure, and a sense of security can be given to the resident.

Incidentally, the invention is not limit to the above embodiment and includes various modifications. For example, the above embodiment is described in detail in order to clearly describe the invention, and all the described components are not necessarily indispensable.

What is claimed is:

1. An electricity demand regulating system for managing electric energy used by a consumer having a plurality of consumer equipments, according to an operation state of a power system, comprising:
 a computer processor;
 a memory;
 a storage part to store measurement information of one or more first consumer equipments of one or more kinds; and
 a generation part to generate a load pattern indicating a load amount tendency from the measurement information of the one or more first consumer equipments stored in the storage part,
 wherein a load amount of a second consumer equipment whose measurement information is not stored in the storage part is estimated from the load pattern generated by the generation part, wherein an electricity demand amount of the consumer is obtained based on the measurement information of the one or more first consumer equipments and the estimated load amount, wherein the estimated load amount of the second consumer equipment is obtained by estimating a probability density of electricity demand of the second consumer equipment by using information on the kinds of the consumer equipments and the stored measurement information of the one or more first consumer equipments, and wherein the probability density of electricity demand of the second consumer equipment is estimated by combining the probability densities of electricity demand of a plurality of the first consumer equipments which are of the same kind as the second consumer equipment and averaging the combined probability densities.

2. The electricity demand regulating system according to claim 1, wherein the load pattern generated by the generation part is generated by using a probability density.

3. The electricity demand regulating system according to claim 1, wherein the load amount of the second consumer equipment whose measurement information is not stored is estimated from the load pattern and based on a kind of each of the one or more first consumer equipments whose measurement information is stored and a kind of the second consumer equipment whose measurement information is not stored.

4. The electricity demand regulating system according to claim 1, further comprising an overload determination part to make an overload determination of an equipment of the power system, wherein
a required adjustment amount indicating an adjustment amount of electricity demand for the equipment is obtained based on the overload determination of the determination part.

5. The electricity demand regulating system according to claim 4, wherein the overload determination is performed based on a load state and a capacity of the equipment of the power system.

6. The electricity demand regulating system according to claim 4, further comprising an adjustment amount setting part to set an adjustment target value of the electricity demand by the second consumer equipment based on the required adjustment amount and the estimated load amount of the second consumer equipment.

7. The electricity demand regulating system according to claim 6, further comprising:
an adjustment target equipment selection part to select, based on the adjustment target value, at least one of the consumer equipments as an adjustment target equipment whose working state is to be changed; and
an adjustment request transmission part to send an adjustment request to the consumer to change the working state of the adjustment target equipment.

8. The electricity demand regulating system according to claim 4, further comprising
a display part to display the required adjustment amount, and
an input part to input information of the electricity demand by the second consumer equipment.

9. The electricity demand regulating system according to claim 1,
wherein the stored measurement information of the one or more first consumer equipments includes a probability density of electricity demand for each of the one or more first consumer equipments and each time the electricity demand of the one or more first consumer equipments is recorded.

10. A system comprising:
a consumer having a plurality of consumer equipments;
a display part to display a working state of the consumer equipments; and
an electricity demand regulating system for managing electric energy used by the consumer according to an operation state of a power system, the electricity demand regulating system including
a computer processor,
a memory,
a storage part to store measurement information of one or more first consumer equipments of one or more kinds, and
a generation part to generate a load pattern indicating a load amount tendency from the measurement information of the one or more first consumer equipments stored in the storage part,
wherein a load amount of a second consumer equipment whose measurement information is not stored in the storage part is estimated from the load pattern generated by the generation part, and
wherein an adjustment request is obtained based on the measurement information of the one or more first consumer equipments and the estimated load amount;
wherein the consumer includes a demand adjustment executive system connected to the electricity demand regulating system via a communication network to receive the adjustment request from the electricity demand regulating system, the demand adjustment executive system including an adjustment request executive part to control the consumer equipments in response to the adjustment request,
wherein the estimated load amount of the second consumer equipment is obtained by estimating a probability density of electricity demand of the second consumer equipment by using information on the kinds of the consumer equipments and the stored measurement information of the one or more first consumer equipments, and
wherein the probability density of electricity demand of the second consumer equipment is estimated by combining the probability densities of electricity demand of a plurality of the first consumer equipments which are of the same kind as the second consumer equipment and averaging the combined probability densities.

11. The system according to claim 10, wherein the load pattern generated by the generation part is generated by using a probability density.

12. The system according to claim 10, wherein the load amount of the second consumer equipment whose measurement information is not stored is estimated from the load pattern and based on a kind of each of the one or more first consumer equipments whose measurement information is stored and a kind of the second consumer equipment whose measurement information is not stored.

13. The system according to claim 10,
wherein the electricity demand regulating system further includes an overload determination part to make an overload determination of an equipment of the power system; and wherein a required adjustment amount indicating an adjustment amount of electricity demand for the equipment is obtained based on the overload determination of the determination part.

14. The system according to claim 13, wherein the electricity demand regulating system further includes an adjustment amount setting part to set an adjustment target value of the electricity demand by the second consumer equipment based on the required adjustment amount and the estimated load amount of the second consumer equipment.

15. The system according to claim 14, wherein the electricity demand regulating system further includes an adjustment target equipment selection part to select, based on the adjustment target value, one of the consumer equipments as an adjustment target equipment whose working state is to be changed, and an adjustment request transmission part to send an adjustment request to the consumer.

16. The system according to claim 15, wherein the display part of the demand adjustment executive system is configured to display the adjustment target equipment which is subjected to the control and a control state including continuation time or period information of the control.

17. The system according to claim 10, wherein the stored measurement information of the one or more first consumer equipments includes a probability density of electricity demand for each of the one or more first consumer equipments and each time the electricity demand of the one or more first consumer equipments is recorded.

* * * * *